United States Patent
Little et al.

(10) Patent No.: US 9,720,181 B2
(45) Date of Patent: Aug. 1, 2017

(54) HYBRID CONNECTOR FOR BOTH ELECTRICAL AND OPTICAL TRANSMISSION

(71) Applicant: FOXCONN INTERCONNECT TECHNOLOGY LIMITED, Grand Cayman, KY (US)

(72) Inventors: Terrance F. Little, Fullerton, CA (US); Yuan Zhang, Rowland-Heights, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/080,613

(22) Filed: Mar. 25, 2016

(65) Prior Publication Data
US 2016/0285215 A1 Sep. 29, 2016

Related U.S. Application Data

(60) Provisional application No. 62/137,829, filed on Mar. 25, 2015.

(51) Int. Cl.
| | | |
|---|---|---|
| G02B 6/38 | (2006.01) |
| G02B 6/42 | (2006.01) |
| H01R 13/66 | (2006.01) |
| H01R 13/719 | (2011.01) |
| H01R 24/64 | (2011.01) |
| H01R 107/00 | (2006.01) |

(52) U.S. Cl.
CPC ......... *G02B 6/3817* (2013.01); *G02B 6/3897* (2013.01); *H01R 13/6658* (2013.01); *G02B 6/3885* (2013.01); *G02B 6/421* (2013.01); *G02B 6/428* (2013.01); *G02B 6/4293* (2013.01); *H01R 13/719* (2013.01); *H01R 24/64* (2013.01); *H01R 2107/00* (2013.01)

(58) Field of Classification Search
CPC .. G02B 6/3817; G02B 6/3897; G02B 6/3885; G02B 6/421; G02B 6/428; G02B 6/4293; H01R 13/6658; H01R 13/719; H01R 24/64; H01R 2107/00
See application file for complete search history.

(56) References Cited

U.S. PATENT DOCUMENTS

| | | | |
|---|---|---|---|
| 5,896,480 A | 4/1999 | Scharf et al. | |
| 7,326,087 B2 * | 2/2008 | Gerlach | G02B 6/3817 385/53 |

(Continued)

*Primary Examiner* — John M Bedtelyon
(74) *Attorney, Agent, or Firm* — Wei Te Chung; Ming Chieh Chang

(57) ABSTRACT

The present invention is to provide a hybrid connector essentially formed with an RJ45 configuration while further equipped with an MPO device wherein the receptacle connector includes an insulative housing defining an RJ45 receiving cavity and a holder assembly located behind the housing. The holder assembly includes a holder and a printed circuit board is assembled upon the holder with a plurality of transformers thereon. A plurality of contacts are retained by and connected to the printed circuit boar with corresponding resilient contacting sections extending forwardly into the receiving cavity. An MPO device is retained in the holder with corresponding optical fibers forwardly directed toward the receiving cavity.

20 Claims, 25 Drawing Sheets

(56) References Cited

U.S. PATENT DOCUMENTS

| | | | |
|---|---|---|---|
| 8,708,754 B2 * | 4/2014 | Su | ........................ G02B 6/3817 385/75 |
| 2011/0243505 A1 | 10/2011 | Su et al. | |
| 2012/0314999 A1 * | 12/2012 | Wu | ........................ G02B 6/3821 385/77 |

* cited by examiner

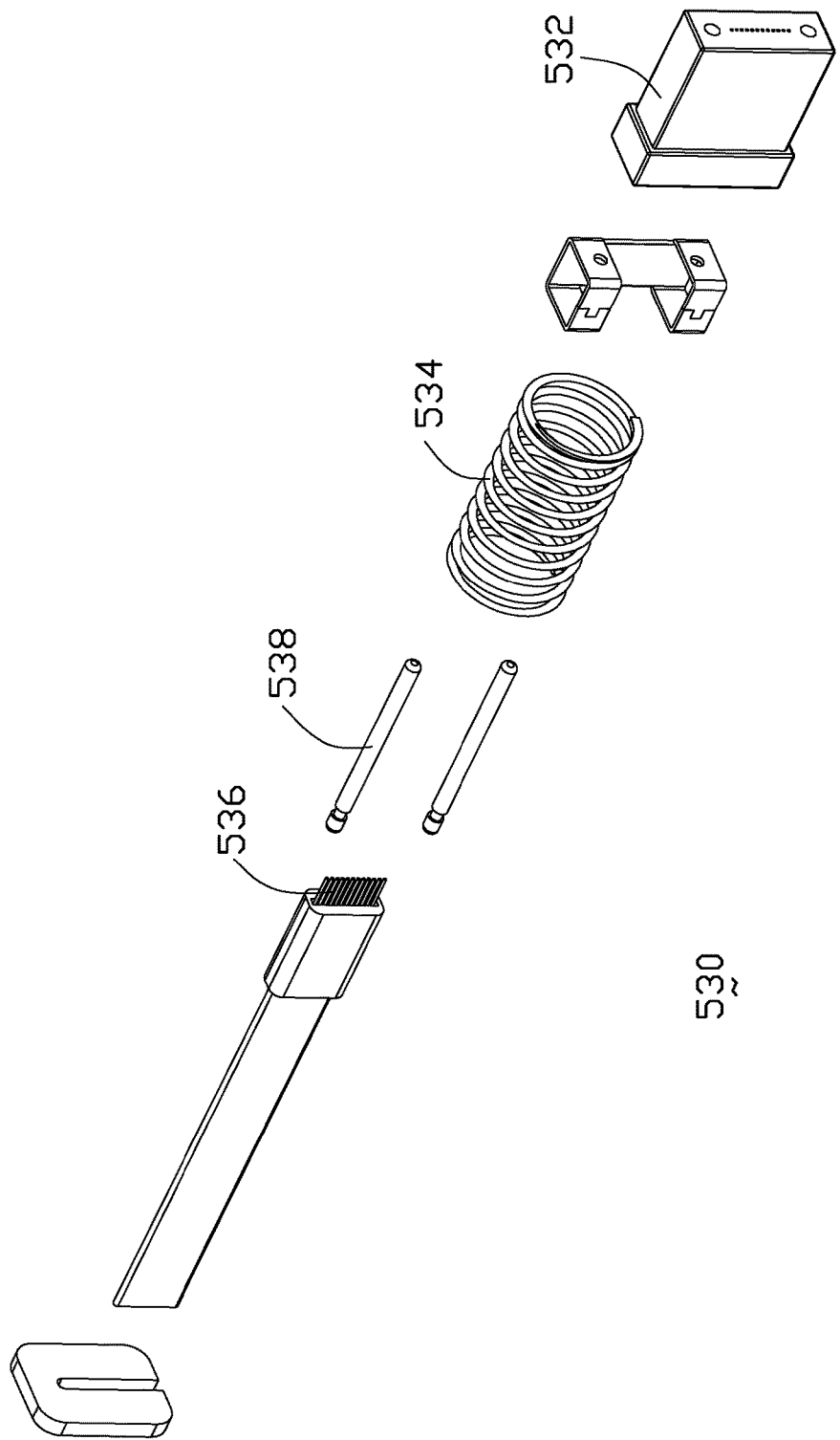

HYBRID CONNECTOR FOR BOTH ELECTRICAL AND OPTICAL TRANSMISSION

This application claims the benefit of, and priority to U.S. Provisional Patent Application No. 62/137,829, filed Mar. 25, 2015, the contents of which are incorporated entirely herein by reference.

BACKGROUND OF THE INVENTION

1. Field of the Invention

The present invention relates to a hybrid connector, and more particularly to a connector with the RJ45 configuration while further equipped with MPO (Multi-fiber Push On) device therewith so as to transmit both electrical and optical signals therein.

2. Description of Related Art

U.S. Pat. No. 8,708,754 discloses a hybrid connector with the regular RJ45 configuration to transmit both electrical and optical signals. Anyhow, only two optic fibers are available in such a design and no resilient force is provided for assuring coupling between the coupled optical fibers of the mated plug connector and the RJ connector. Therefore, a hybrid connector having the regular RJ45 configuration and further equipped with the MPO device for both electrical and optical transmission is desired.

SUMMARY OF THE INVENTION

Accordingly, the object of the present invention is to provide a hybrid connector essentially formed with an RJ45 configuration while further equipped with an MPO device wherein the receptacle connector includes an insulative housing defining an RJ45 receiving cavity and a holder assembly located behind the housing. The holder assembly includes a holder and a printed circuit board is assembled upon the holder with a plurality of transformers thereon. A plurality of contacts are retained by and connected to the printed circuit boar with corresponding resilient contacting sections extending forwardly into the receiving cavity. An MPO device is retained in the holder with corresponding optical fibers forwardly directed toward the receiving cavity. The corresponding plug includes an insulative case defining a cavity to receive another MPO device therein, and a plurality of passageways to receive a plurality of terminals therein. A circuit board is located behind the case, to which the terminals are connected. An electrical cable is mounted to a rear portion of the circuit board and an optical cable is connected to the another MPO device. Notably, the coupling between the optical fibers of the receptacle connector and the plug connector occurs at the middle level of the receiving cavity compared with the aforementioned U.S. Pat. No. 8,708,754 in which the optical coupling between the plug connector and the receptacle connector occurs offset from the middle level of the receiving cavity.

Another approach is to provide the MPO device beside the receiving cavity of the RJ45 in a side-by-side manner wherein the MPO is essentially in an upstanding manner. Under this situation, the MPO device may have sufficient space to arrange the corresponding parts including the spring which provides coupling resiliency thereof.

Other objects, advantages and novel features of the invention will become more apparent from the following detailed description when taken in conjunction with the accompanying drawings.

BRIEF DESCRIPTION OF THE DRAWINGS

FIG. 14(A) is a front exploded perspective view of the MPO device of the plug connector of FIG. 11(A).

DETAILED DESCRIPTION OF THE PREFERRED EMBODIMENT

Reference will now be made in detail to the preferred embodiment of the present invention.

Figure 1A:
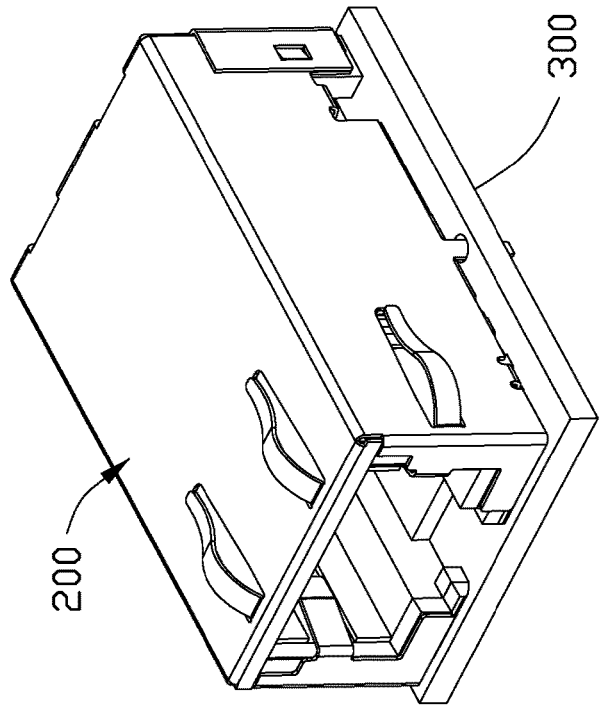
FIG. 1(A) is a front perspective view of the receptacle connector on the printed circuit board and the plug connector according to a first embodiment of the invention.
Figure 1A:
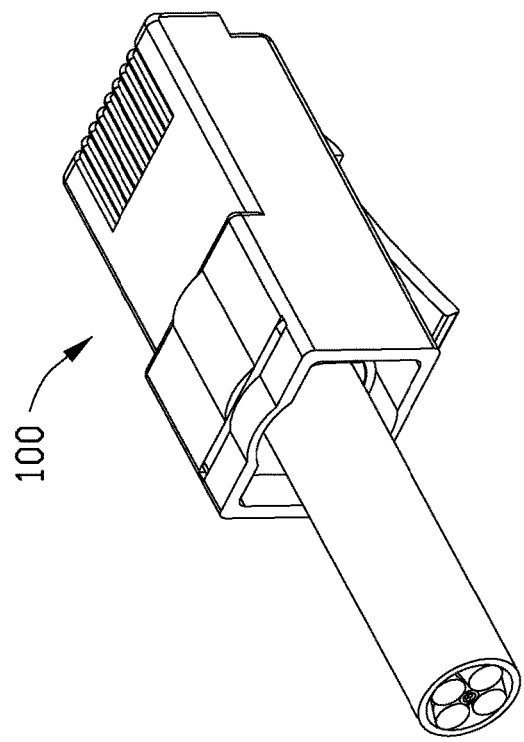
Figure 1B:
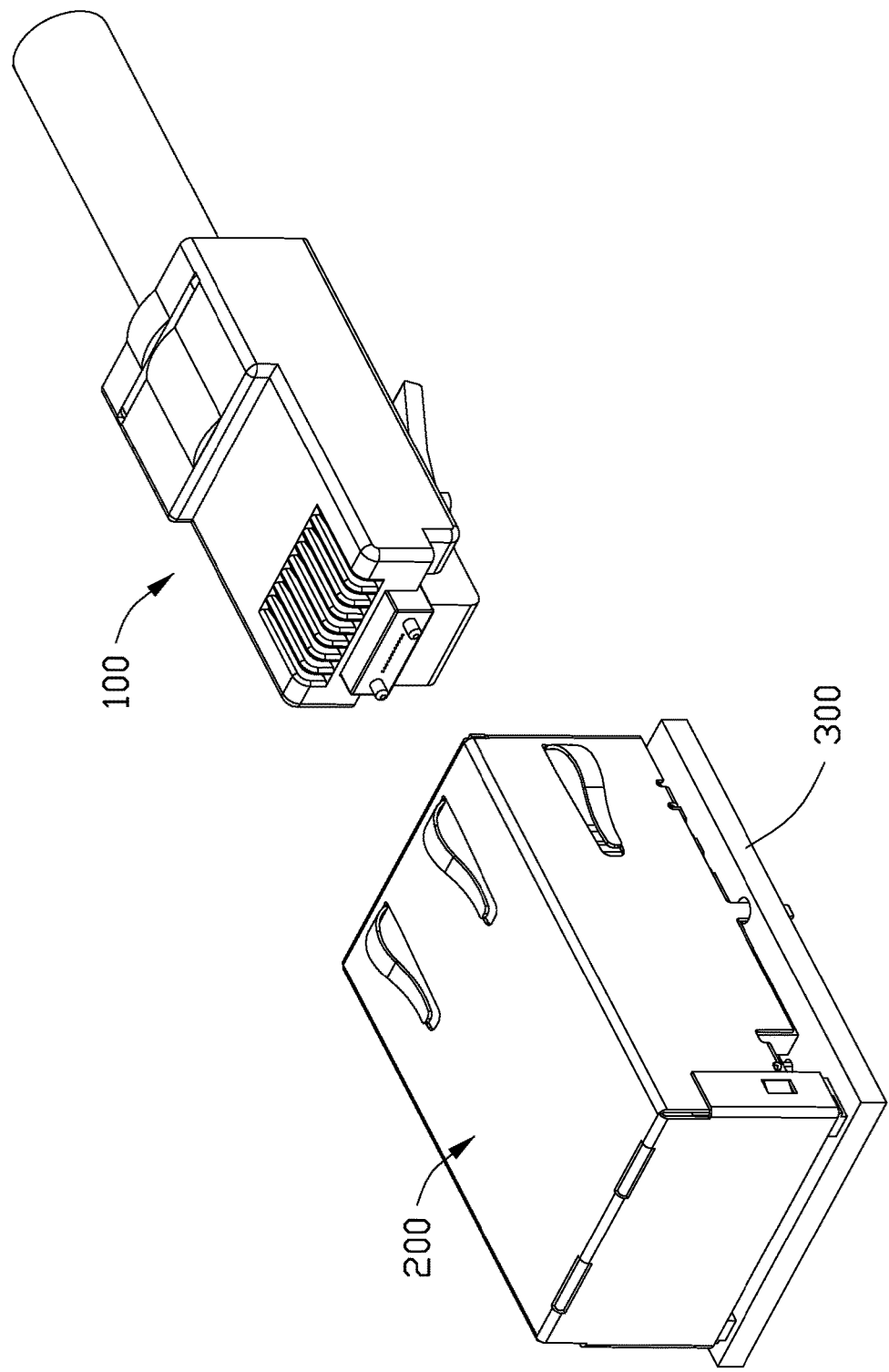
FIG. 1(B) is a rear perspective view of the receptacle connector and the plug connector of FIG. 1(A).
Figure 2A:
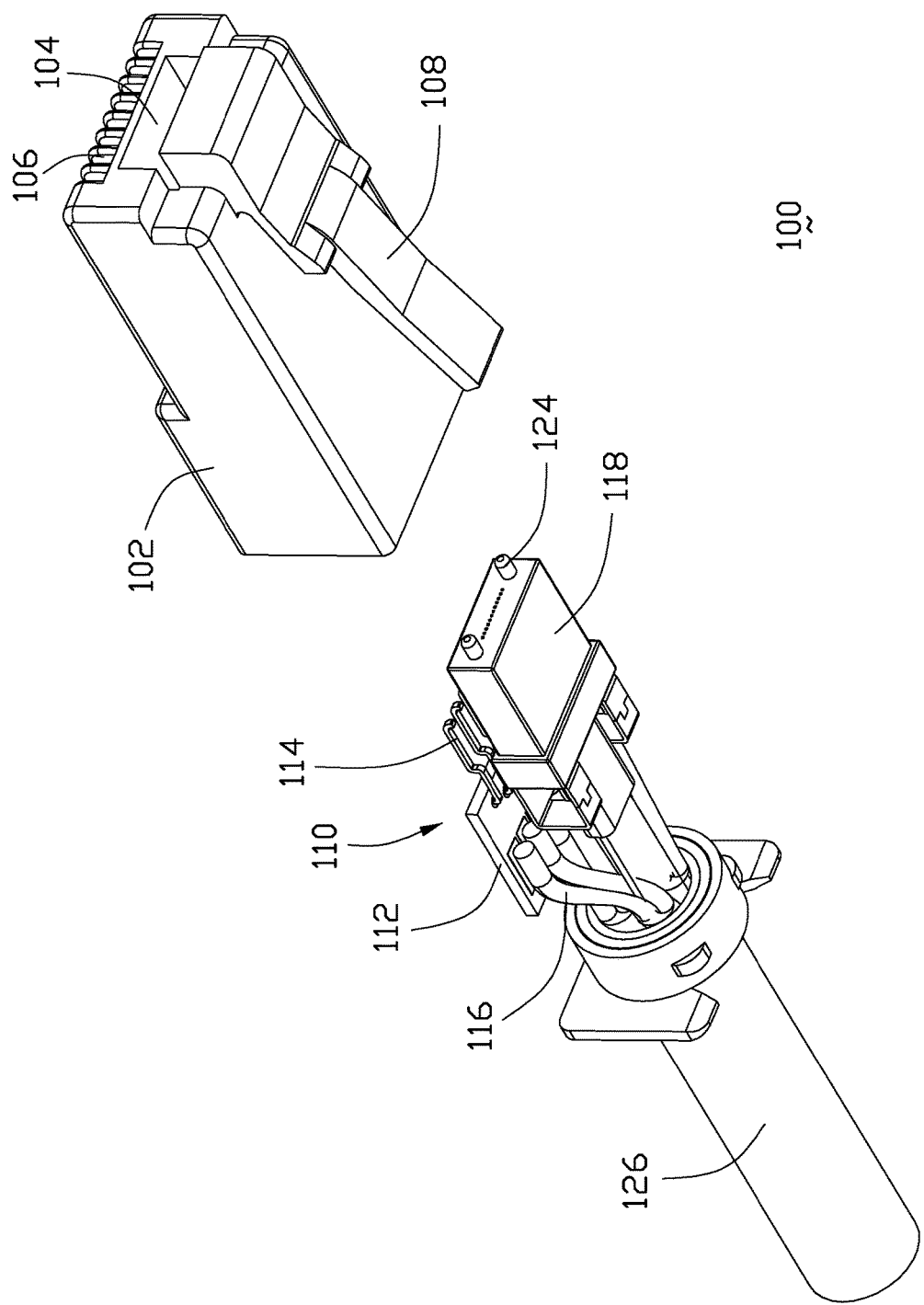
FIG. 2(A) is a front exploded perspective view of the plug connector of FIG. 1.
Figure 2B:
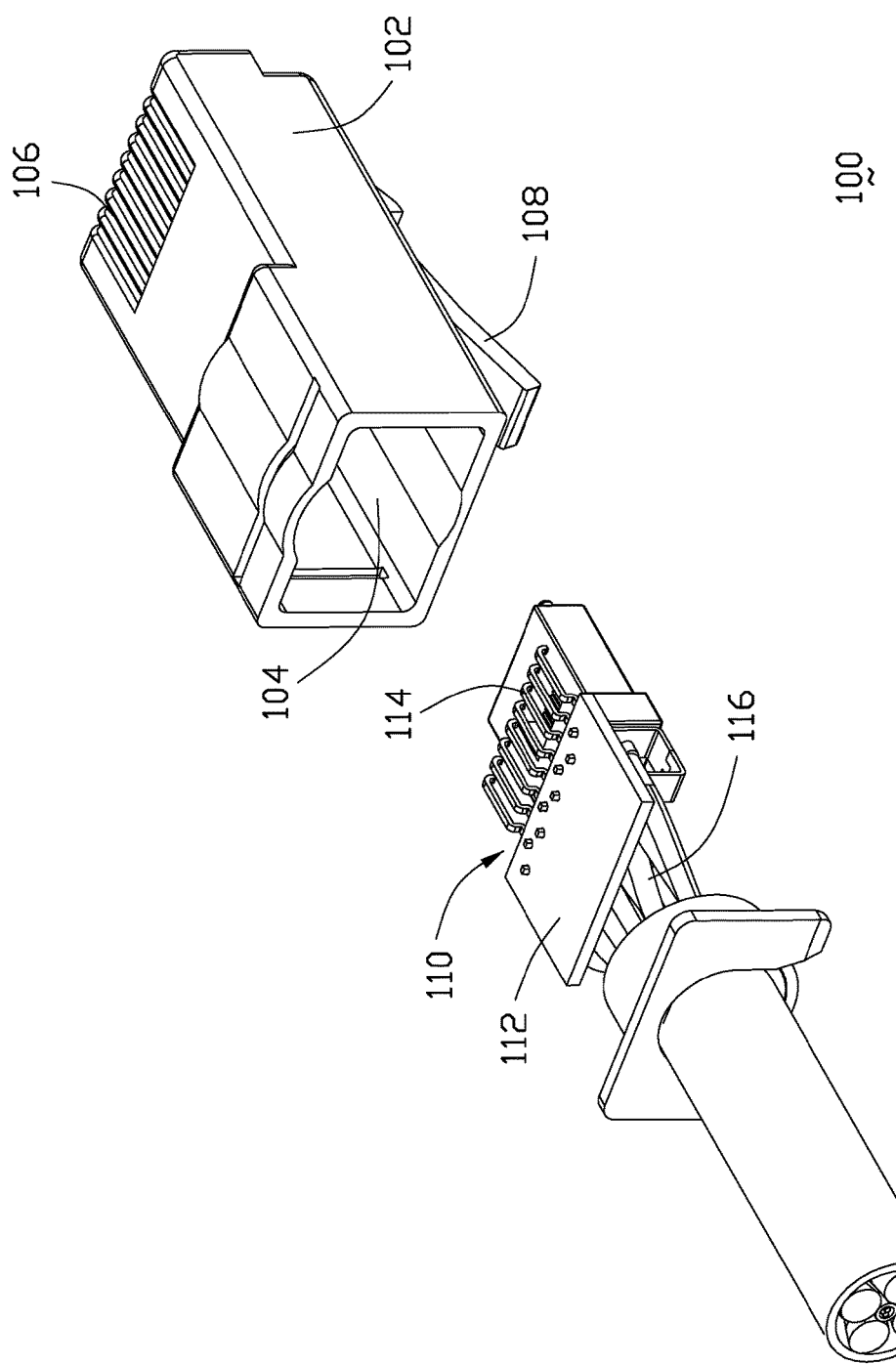
FIG. 2(B) is a rear exploded perspective view of the plug connector of FIG. 1.
Figure 3A:
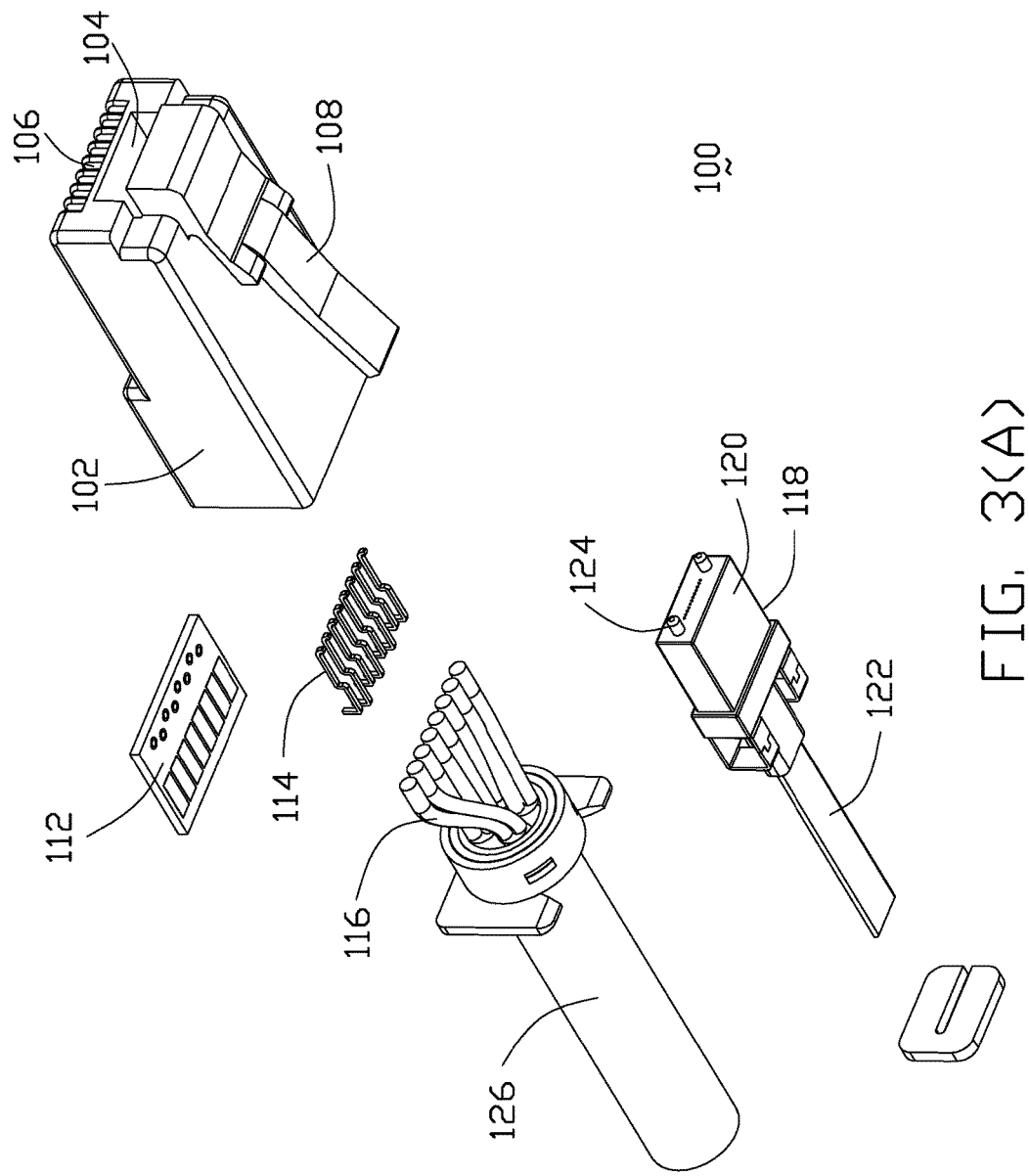
FIG. 3(A) is a further front perspective view of the plug connector of FIG. 2(A).
Figure 3B:
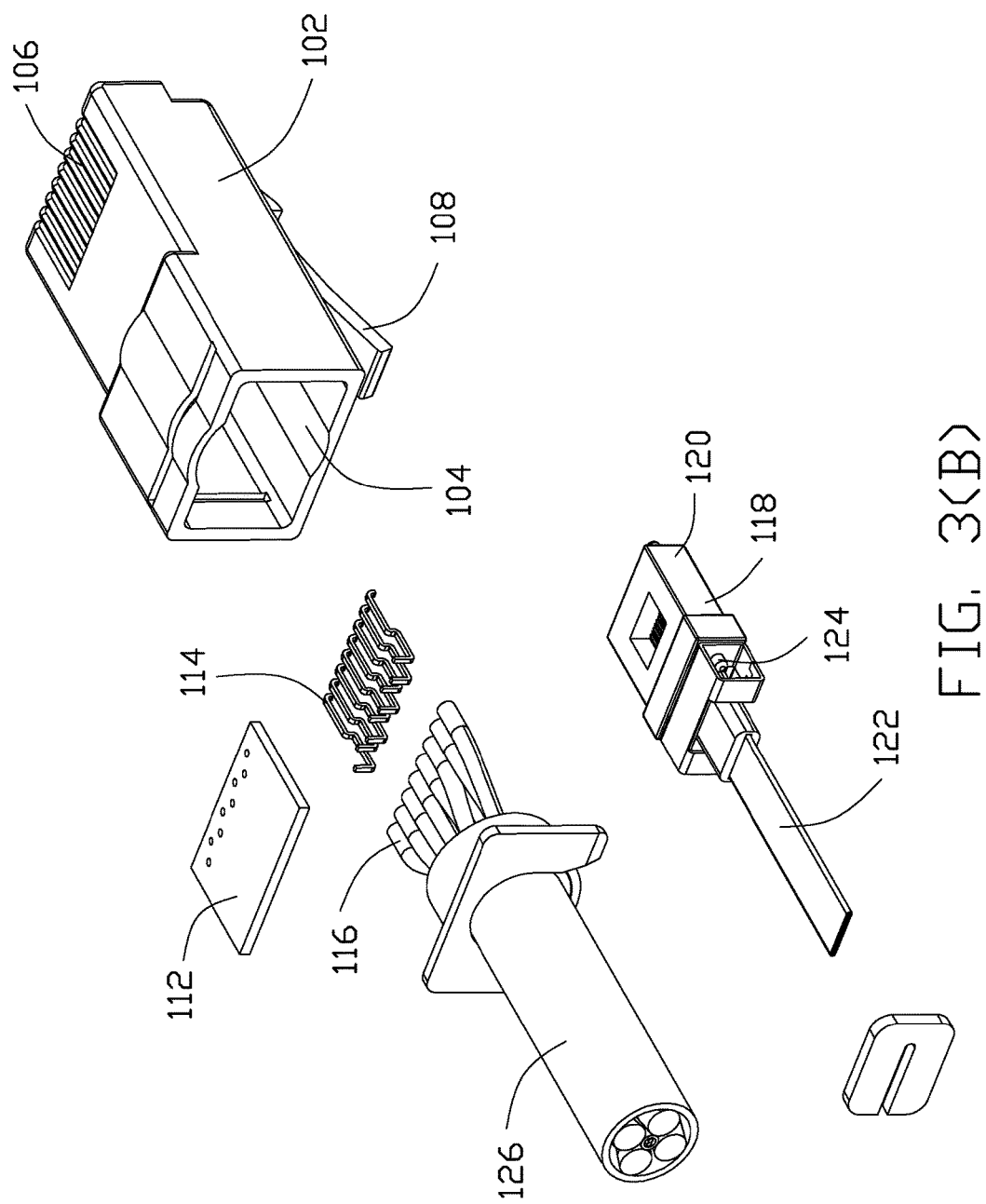
FIG. 3(B) is a further rear exploded perspective view of the receptacle connector of FIG. 2(B).
Figure 4A:
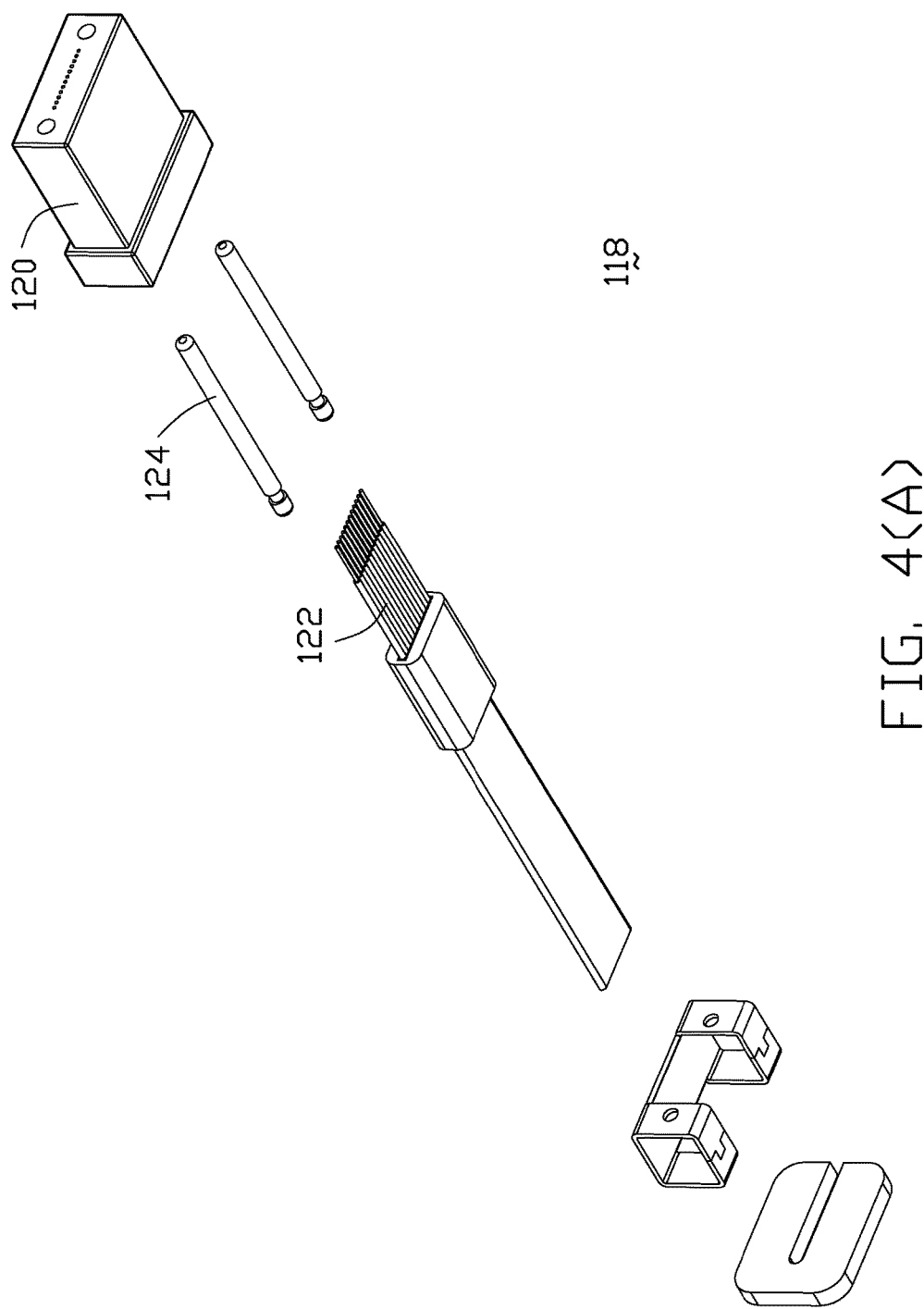
FIG. 4(A) is a further front exploded perspective view of the MPO device of FIG. 3(A).
Figure 4B:
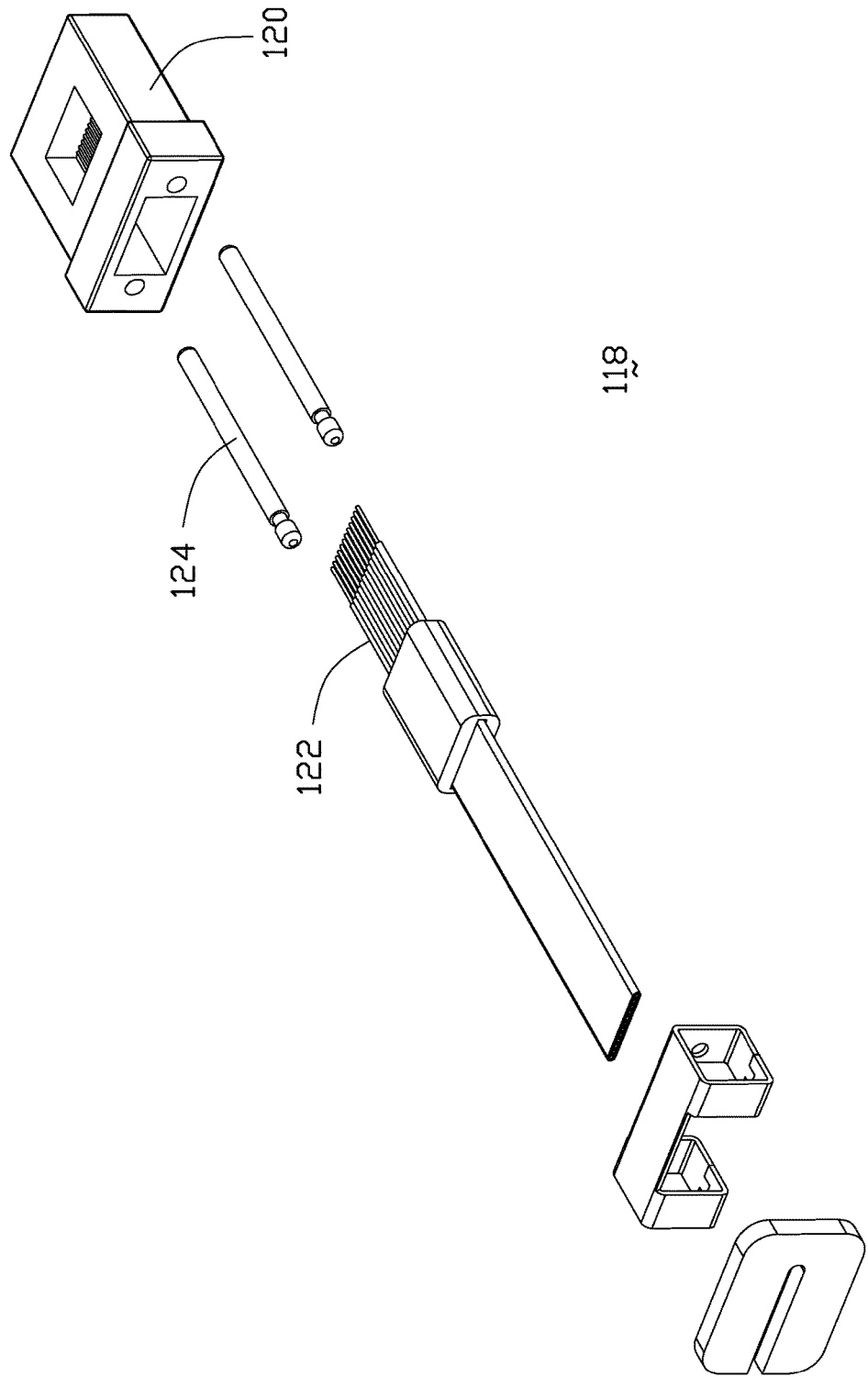
FIG. 4(B) is a further rear exploded perspective view of the MPO of FIG. 3(B).
Figure 5:
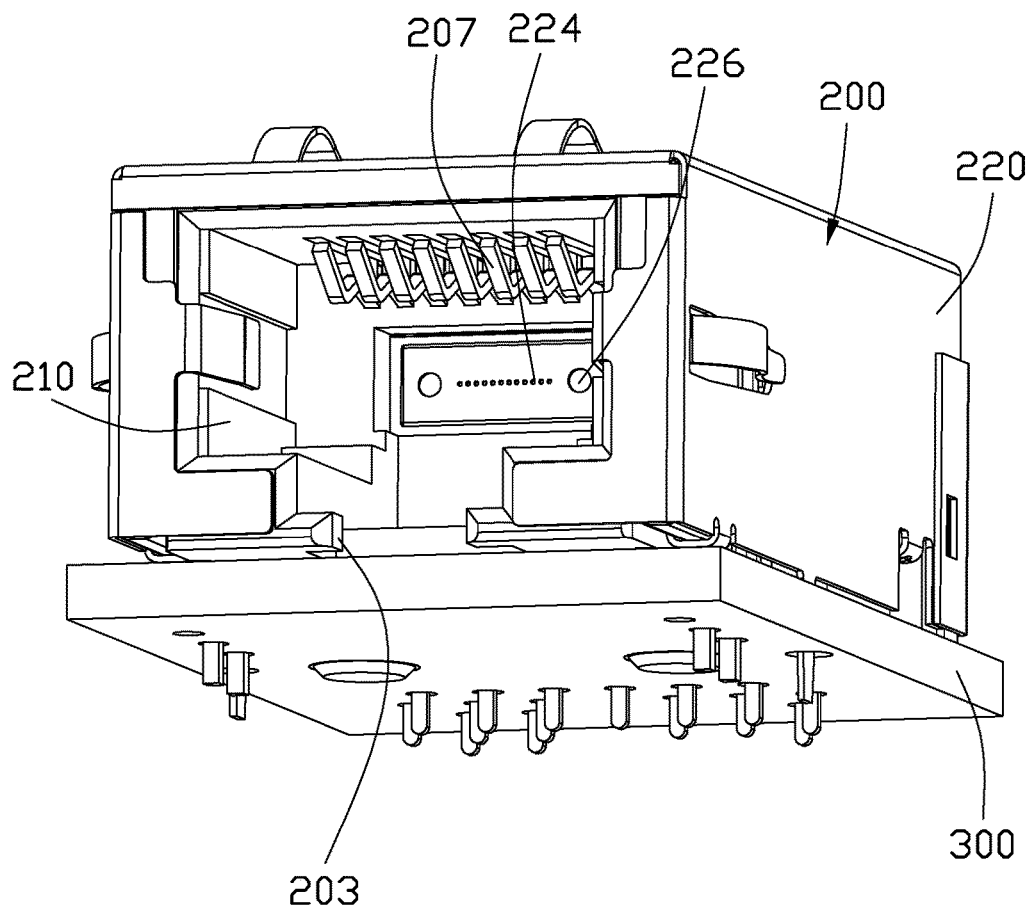
FIG. 5 is a front perspective view of the receptacle connector mounted upon a printed circuit board of FIG. 1.
Figure 6A:
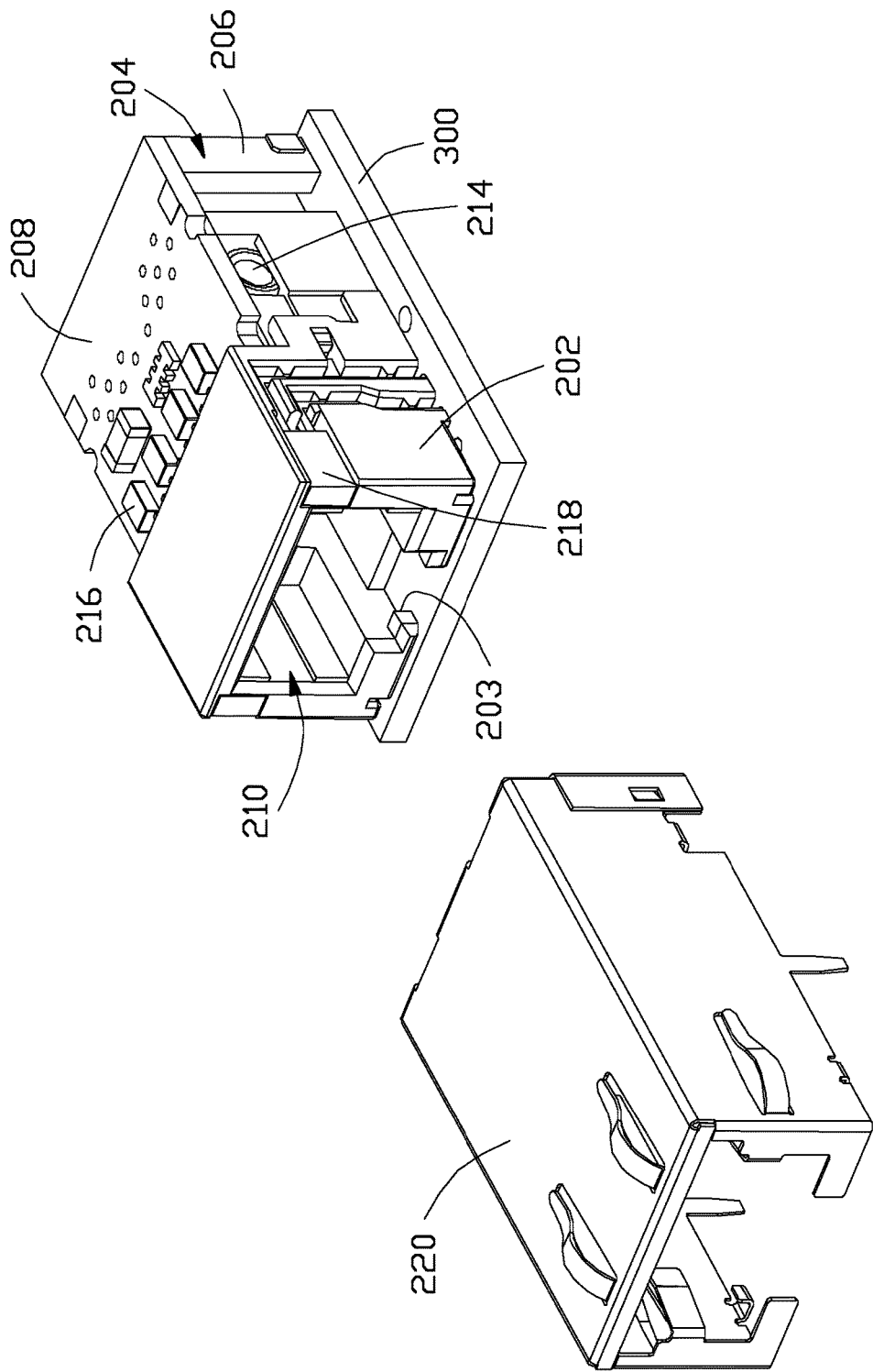
FIG. 6(A) is a front exploded perspective view of the receptacle connector of FIG. 5.
Figure 6B:
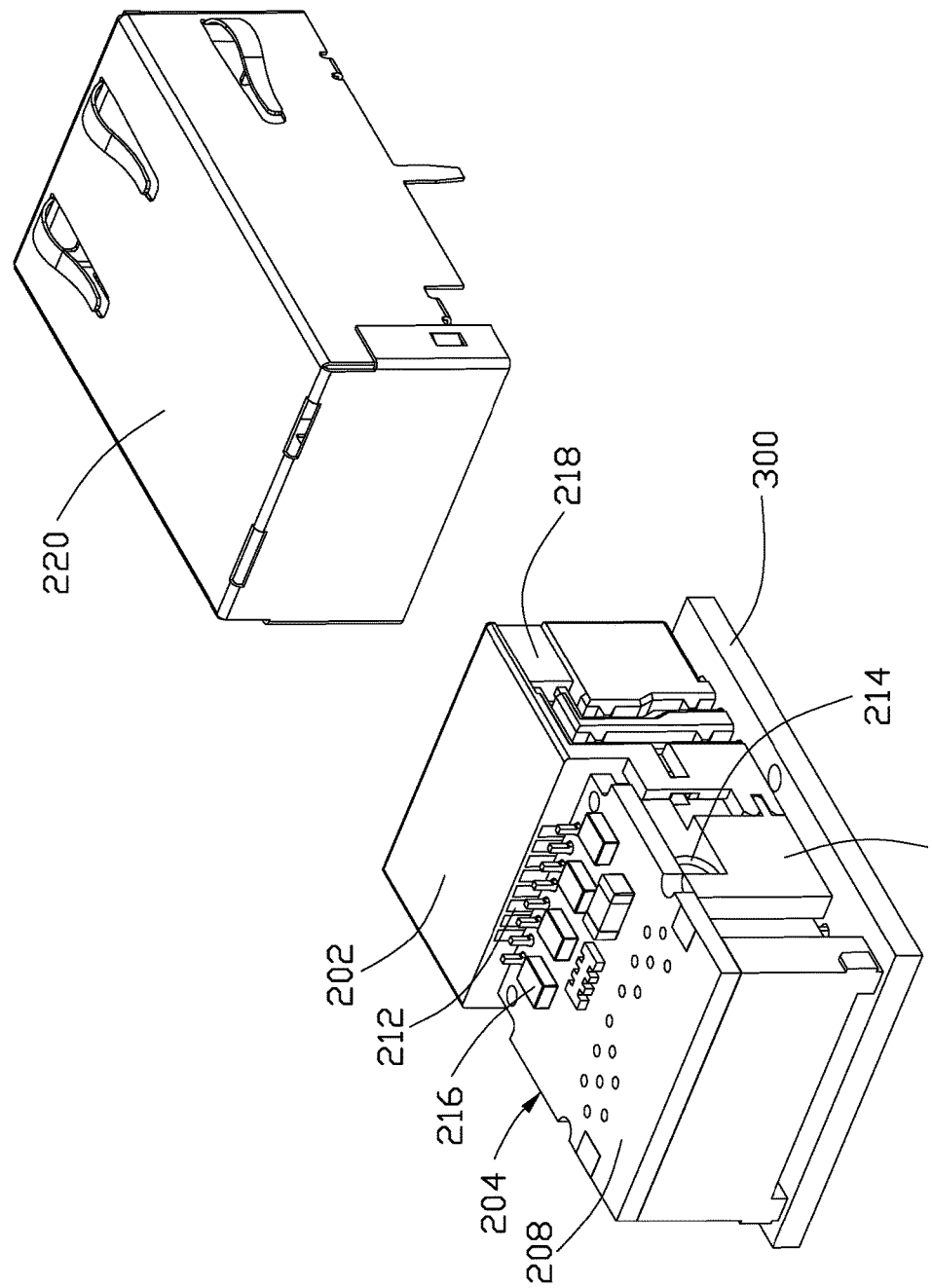
FIG. 6(B) is a rear exploded perspective view of the receptacle connector of FIG. 5.
Figure 7A:
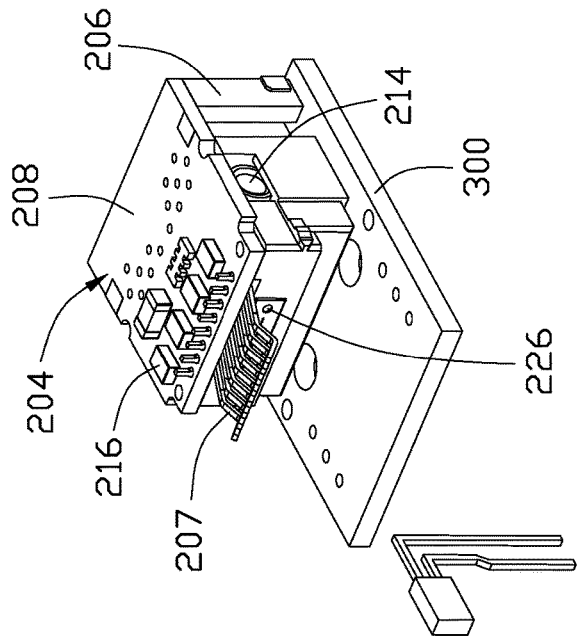
FIG. 7(A) is a further front exploded perspective view of the receptacle connector of FIG. 6(A).
Figure 7A:
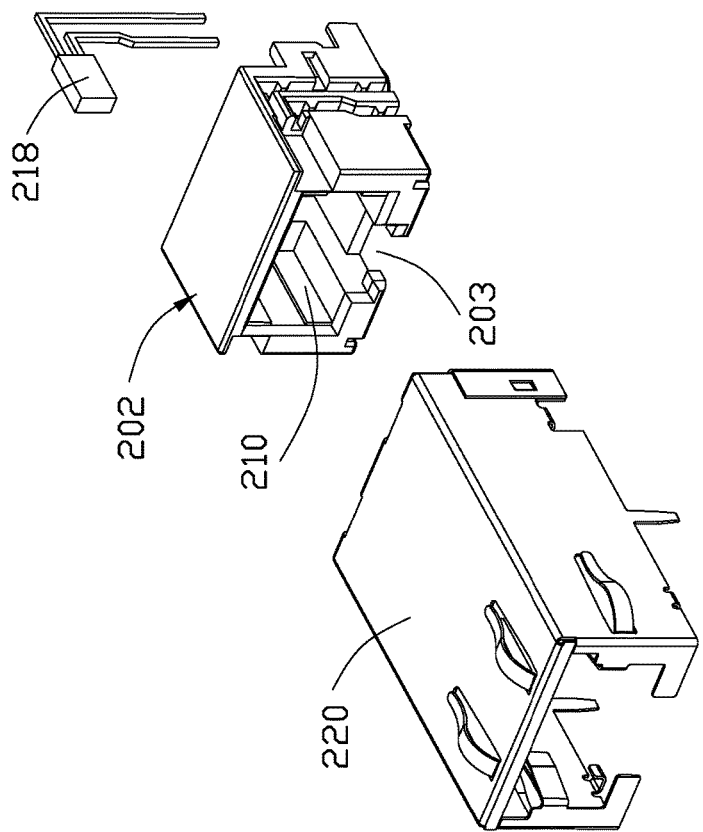
Figure 7B:
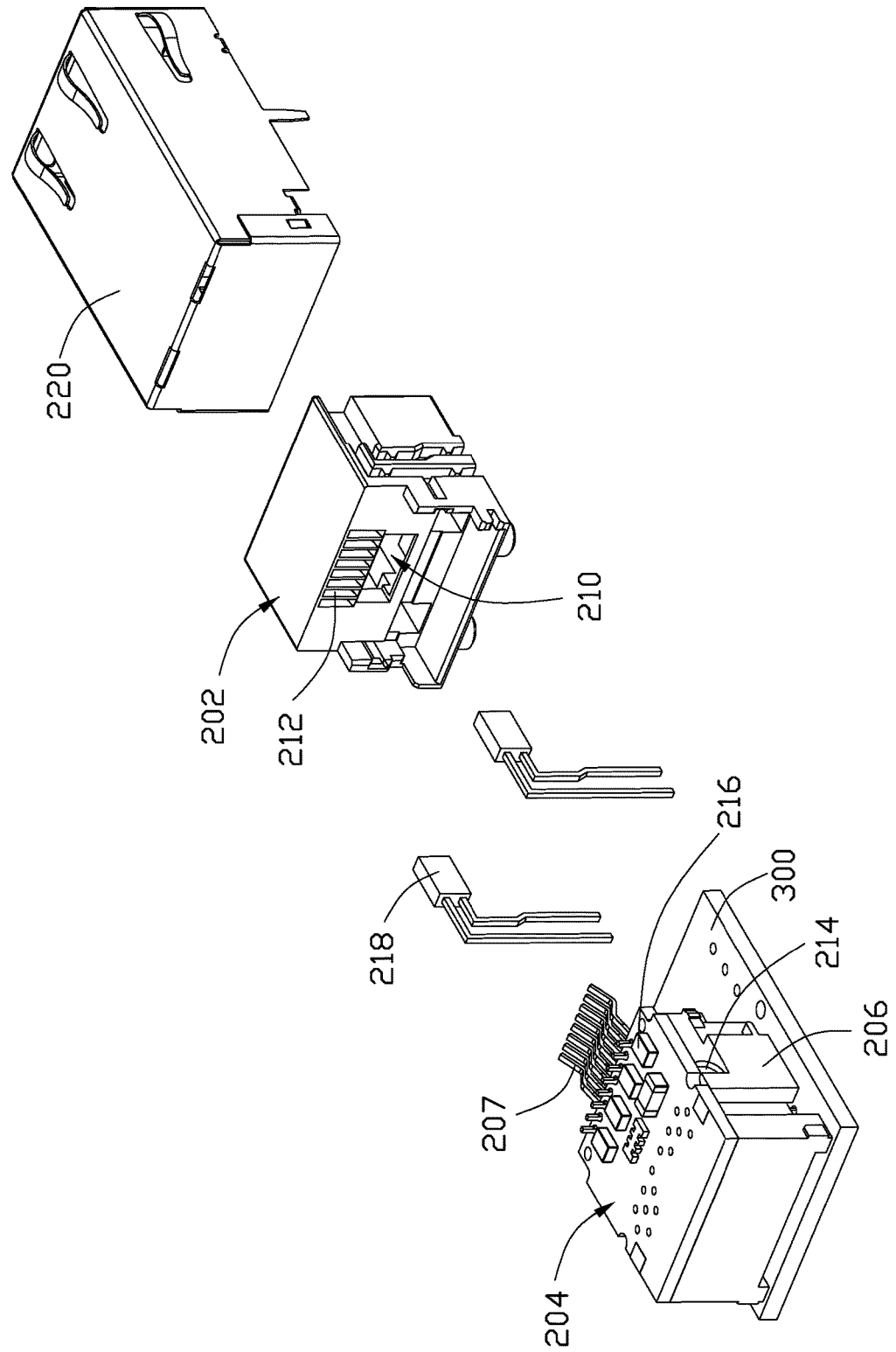
FIG. 7(B) is a further rear exploded perspective view of the receptacle connector of FIG. 6(B).
Figure 8A:
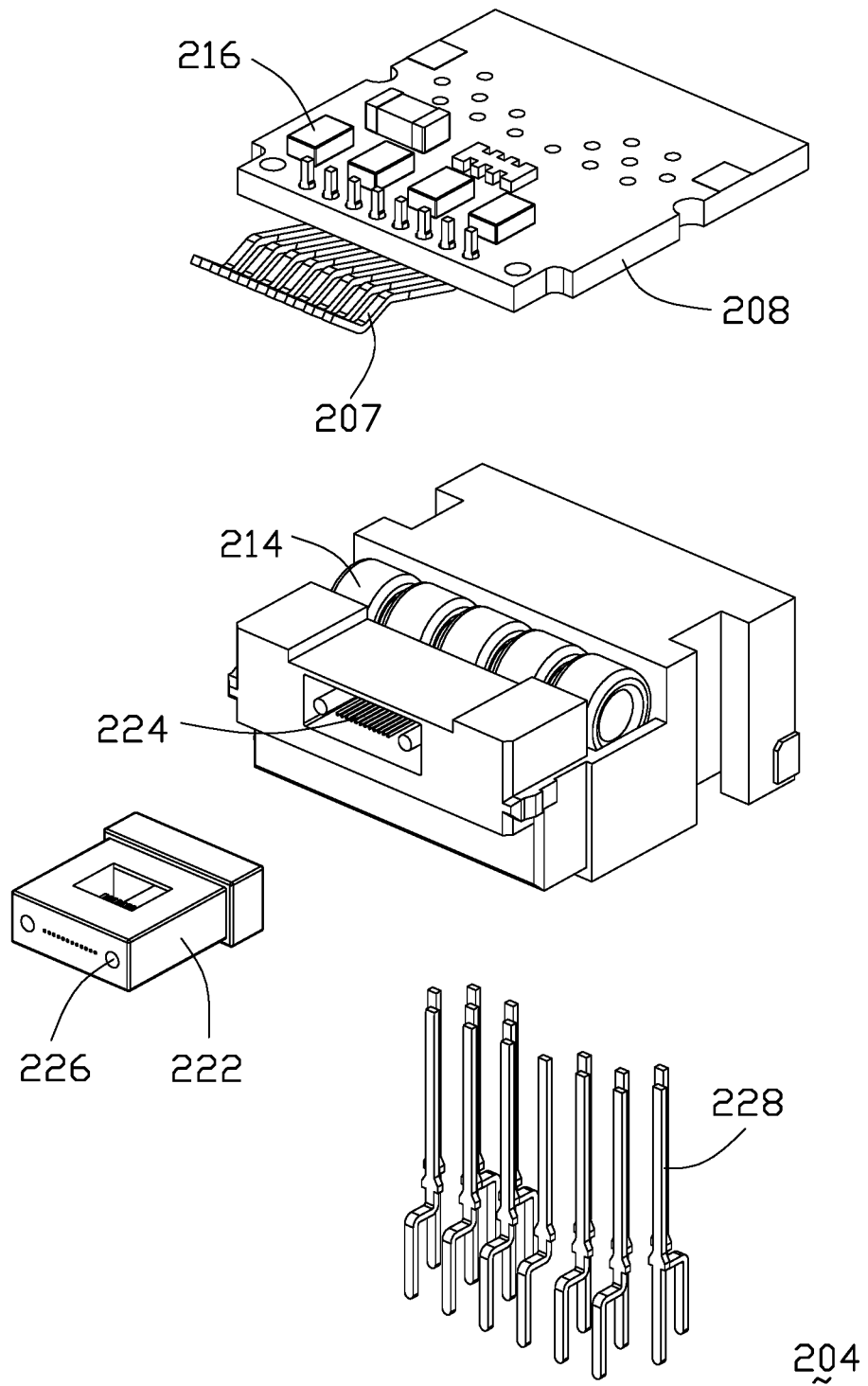
FIG. 8(A) is a front exploded perspective view of the holder assembly of FIG. 5.
Figure 8B:
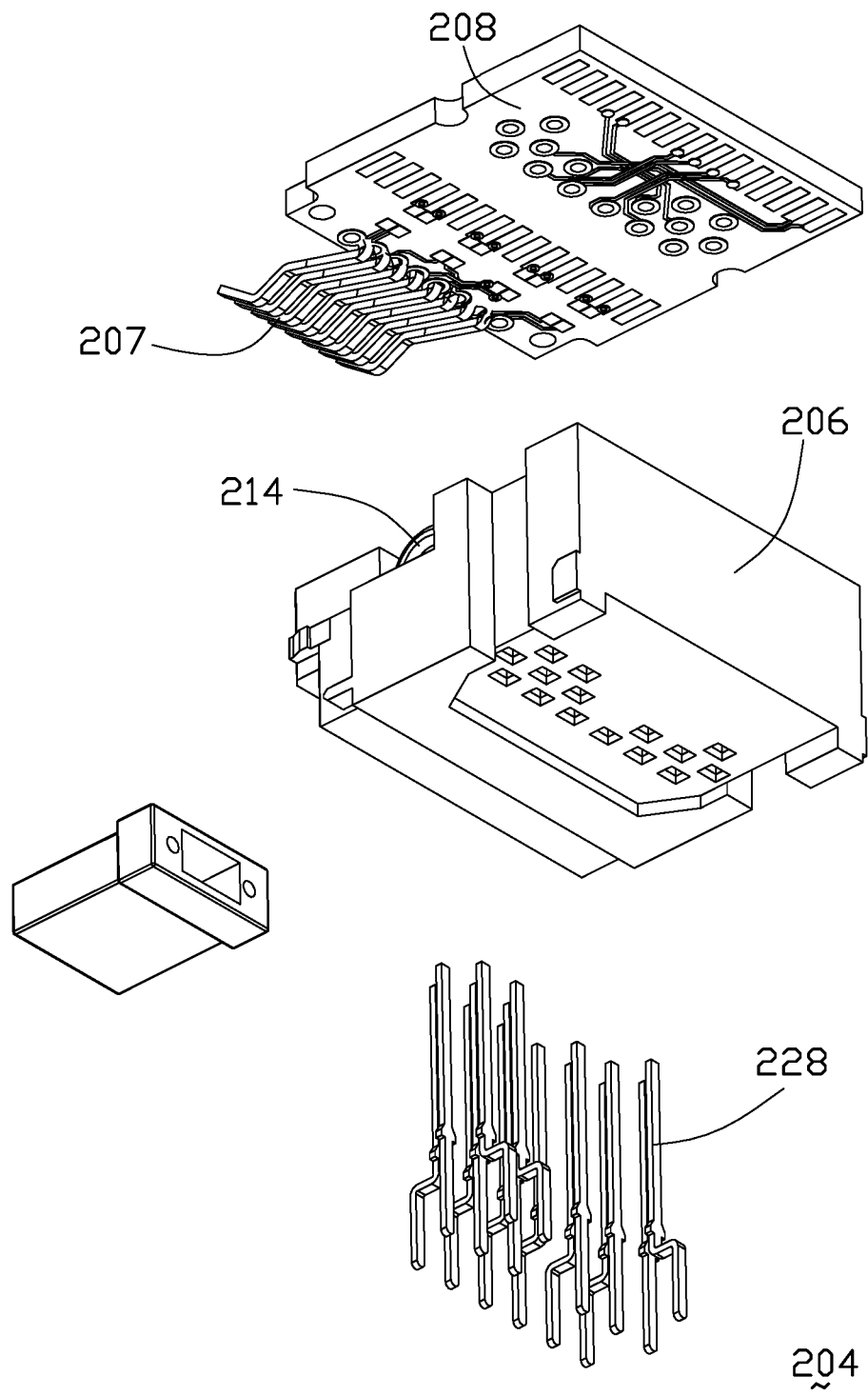
FIG. 8(B) is a rear exploded perspective view of the holder assembly of FIG. 5.
Figure 9:
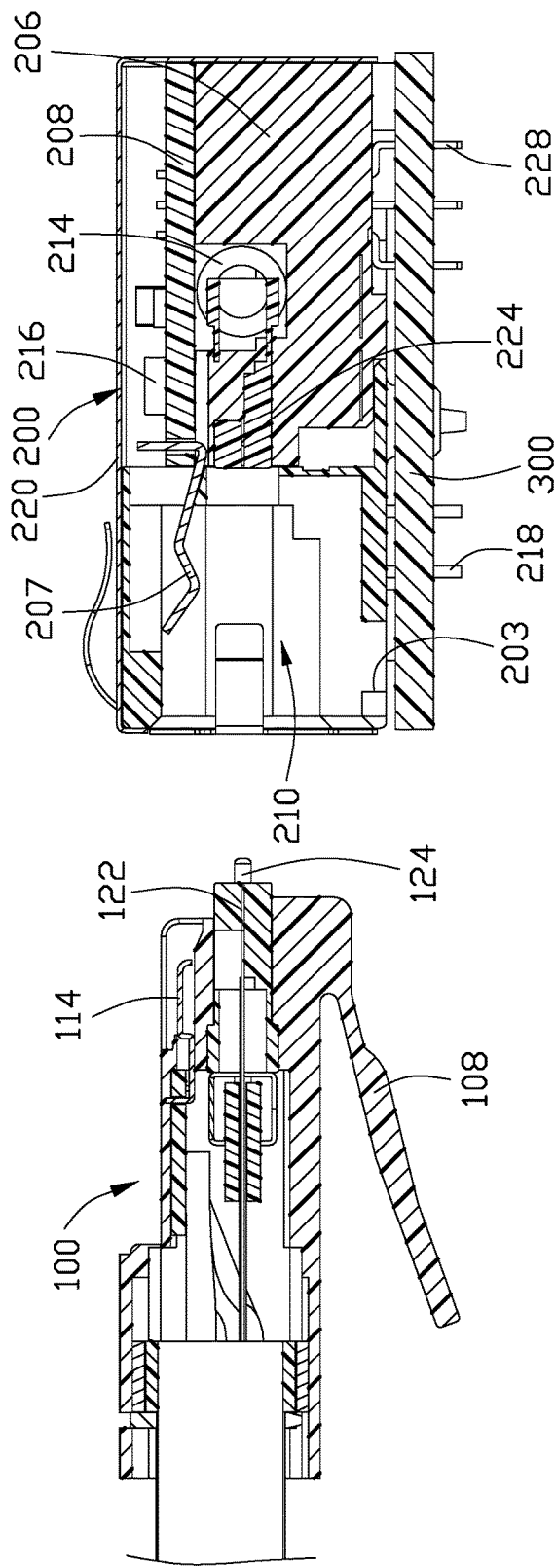
FIG. 9 is a cross-sectional view of the plug connector and the receptacle connector of FIG. 1 in an un-mated manner.
Figure 10:
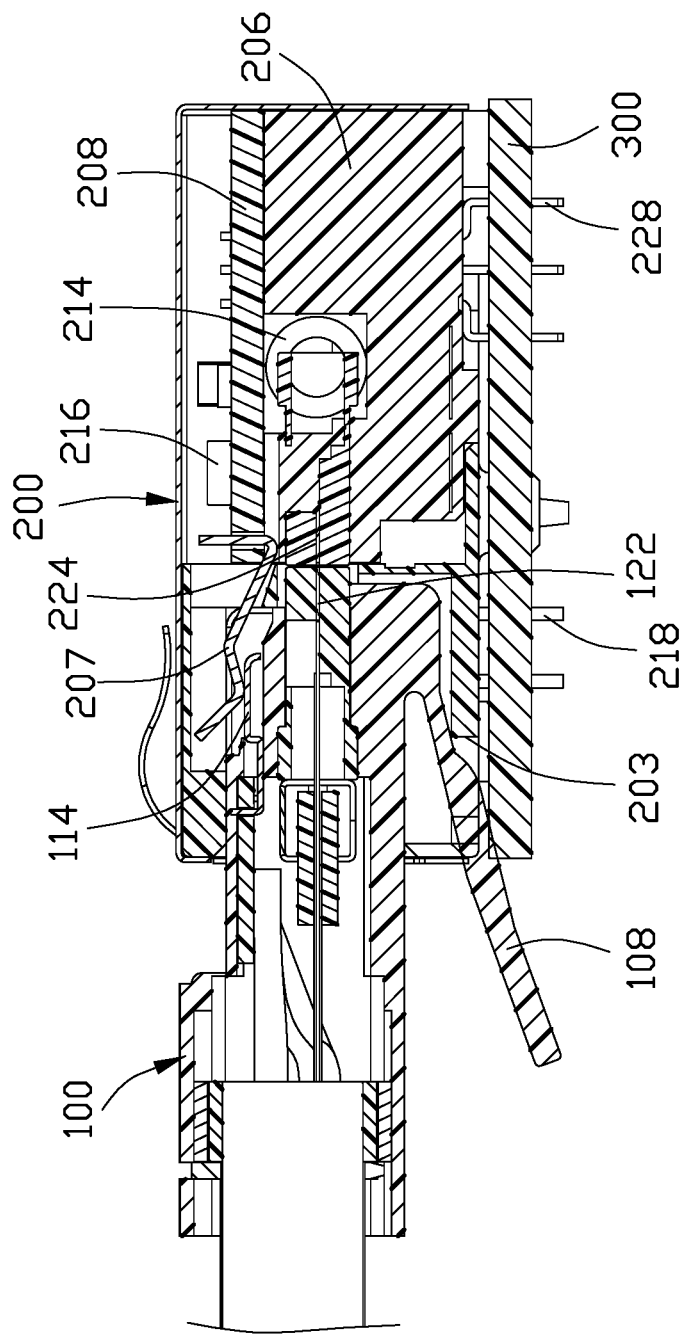
FIG. 10 is a cross-sectional view of the plug connector and the receptacle connector of FIG. 1 in a mated manner.

FIGS. 1-10 show a plug connector 100 mated with a receptacle connector 200 mounted upon a printed circuit board 300. The plug connector 100 includes an insulative case 102 forming a cavity 104 extending therethrough in a front-to-back direction, a plurality of passageways 106 extending through a front face of the case 102 and spaced from the cavity 104 in a vertical direction, and a deflectable latch 108 around the front face opposite to said passageways 106 with the cavity 104 therebetween in the vertical direction.

An connection subassembly 110 received with the cavity 104, includes a printed circuit board 112 with a plurality of terminals 114 connected to a front region of the printed circuit board 112, a plurality of wires 116 connected to a rear region of the printed circuit board 112, and a MPO device 118 which includes a retainer 120 to receive a plurality of optical fibers 122 therein with a pair of guiding posts 124 by two sides. The front face of the retainer 120 protrudes forwardly out of a front face of the case 102 with the pair of guiding posts 124 projecting forwardly beyond the front face of the retaining 120. Notably, in this embodiment the wires 116 and fibers 122 are integrally joined within a cable 126.

The receptacle connector 200 includes an insulative housing 202 and a holder assembly 204 behind the housing 202 in a front-to-back direction. The housing 202 forms an RJ-45 receiving cavity 210 extending therethrough in a front-to-back direction and a plurality of passageways 212 communicating with the receiving cavity 210 in a vertical direction perpendicular to the front-to-back direction. The holder assembly 204 includes a holder 206 and a printed circuit board 208 mounted upon the holder 206. A plurality of contacts 207 are connected to a front region of the printed circuit board 208 and extend into the corresponding passageway 212 to communicate with the receiving cavity 210. A plurality of transformers 214 and a plurality of common mode chokes 216 are mounted upon the printed circuit board 208 wherein the transformers 214 are protectively received within the holder 206. A MPO device 222 is received within the holder 206 with corresponding optical fibers 224 intimately confronting a rear end of the receiving cavity 210. A pair of guiding holes 226 are located by two sides of the optical fibers 224. A plurality of footer pins 228 are retained by the holder 206 with two opposite ends respectively connected to the printed circuit board 208 and the printed circuit board 300. A pair of LEDs (Laser Emitting Diode) 218 are disposed in the housing 202. A metallic shell 220 encloses both the housing 202 and the holder assembly 204. As the traditional RJ-45 housing, the housing 202 forms a locking opening 203 around the front opening for the latch 108 of the plug connector 100.

When the receptacle connector 200 and the plug connector 100 are mated with each other, wherein the case 102 is received within the receiving cavity 210, the guiding posts 124 are received within the corresponding guiding holes 226, the contacts 207 mechanically and electrically connect to the corresponding terminals 114 in the vertical direction, the optical fibers 224 are coupled with the corresponding optical fibers 122 in the front-to-back direciton, and the latch 108 is engaged within the locking opening 203.

Compared with the aforementioned U.S. Pat. No. 8,708,754 which uses the blade type terminal in the plug connector occupying much space to leave tiny space for the MPO device, differently in the instant invention the terminals 114 occupy less space in the case 102 so as to allow the corresponding MPO device 118 to be located at the middle level between the latch 108 and the terminals 114, thus assuring the sufficient dimension of the MPO in the vertical direction and superior arrangement between the electrical transmission and the optical transmission. Another advantage is to have less crosstalk between the neighboring terminals.

Figure 11A:
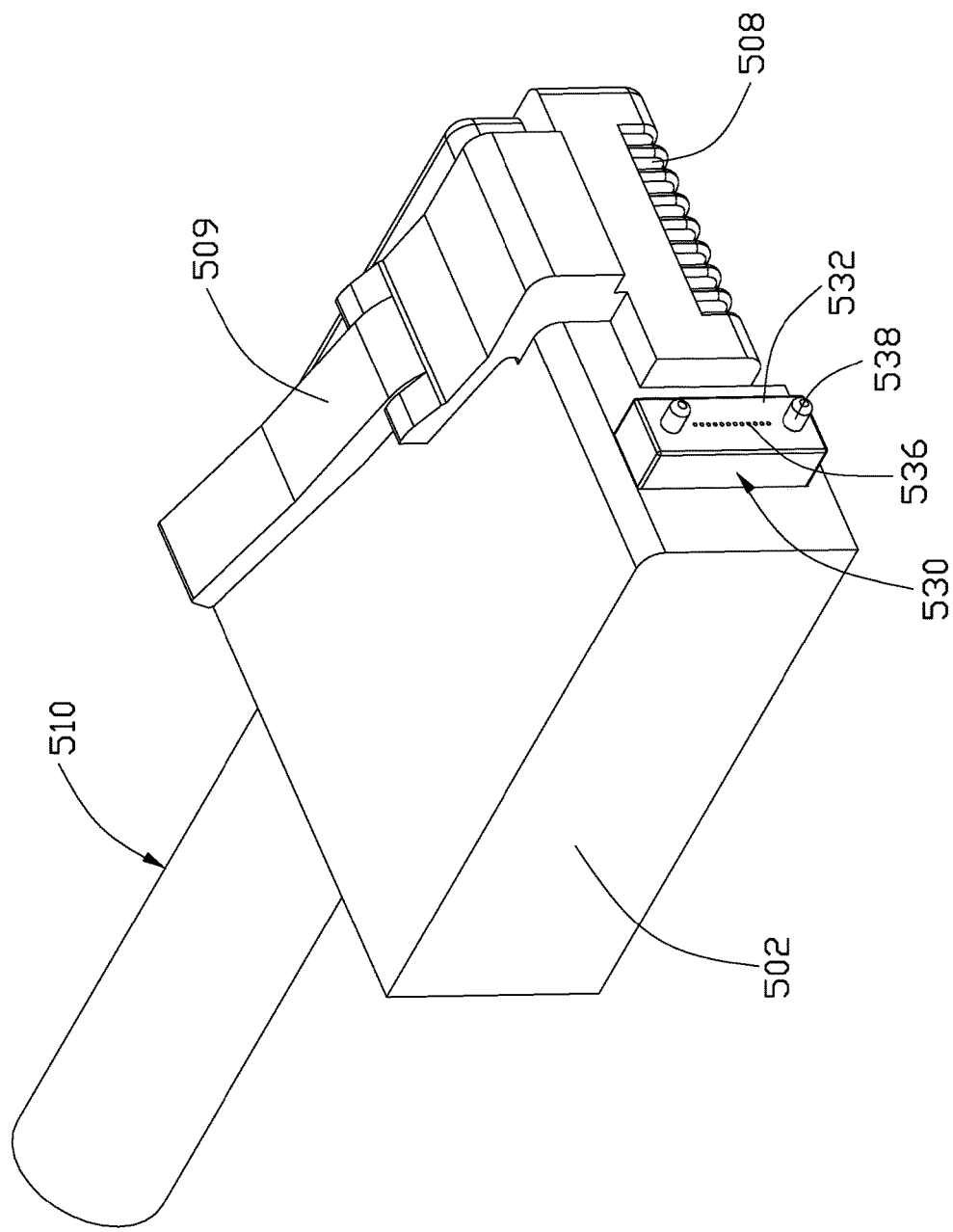
FIG. 11(A) is a front perspective view of the plug connector according to another embodiment of the instant invention.
Figure 11B:
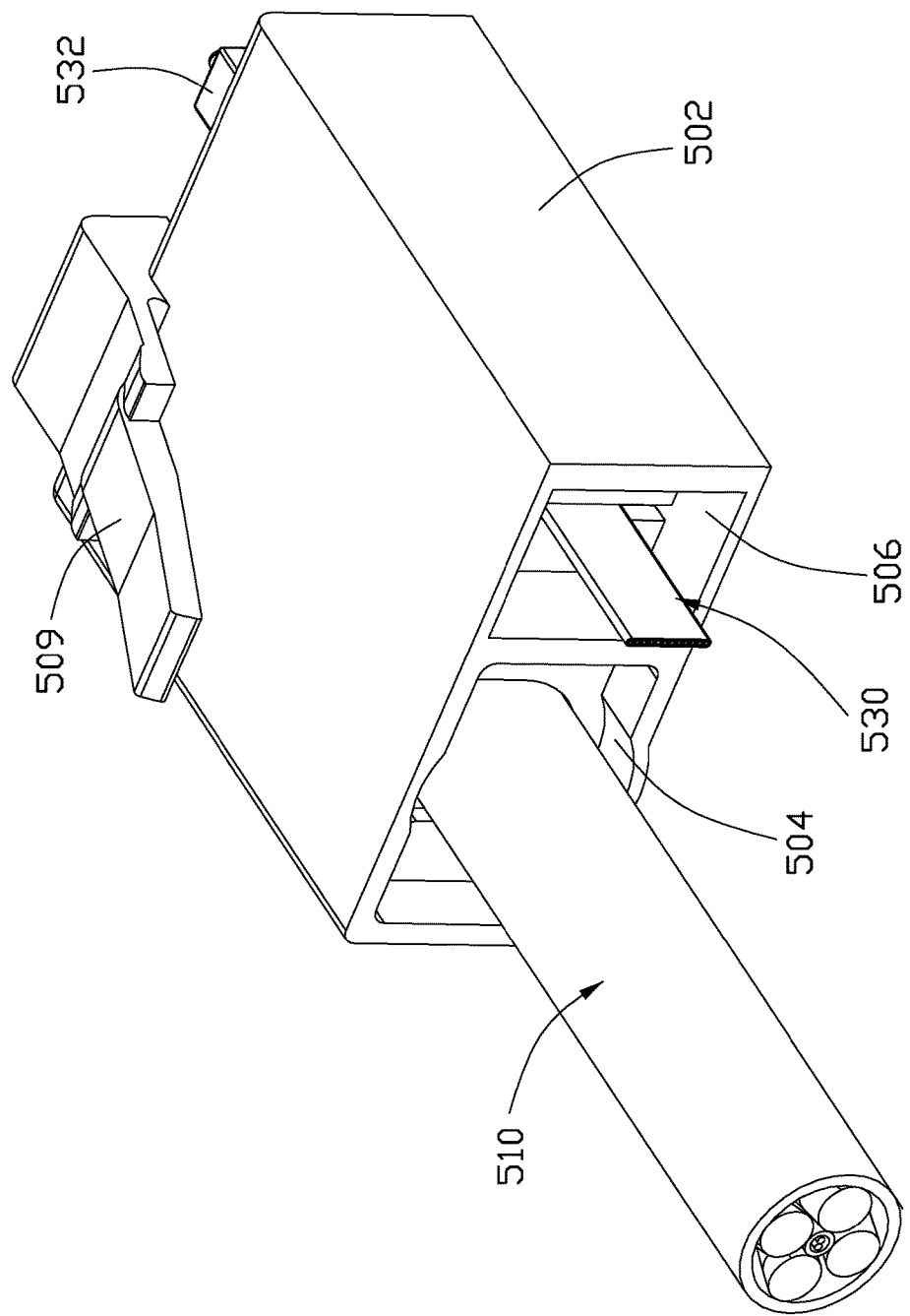
FIG. 11(B) is a rear perspective view of the plug connector of FIG. 11(A).
Figure 12A:
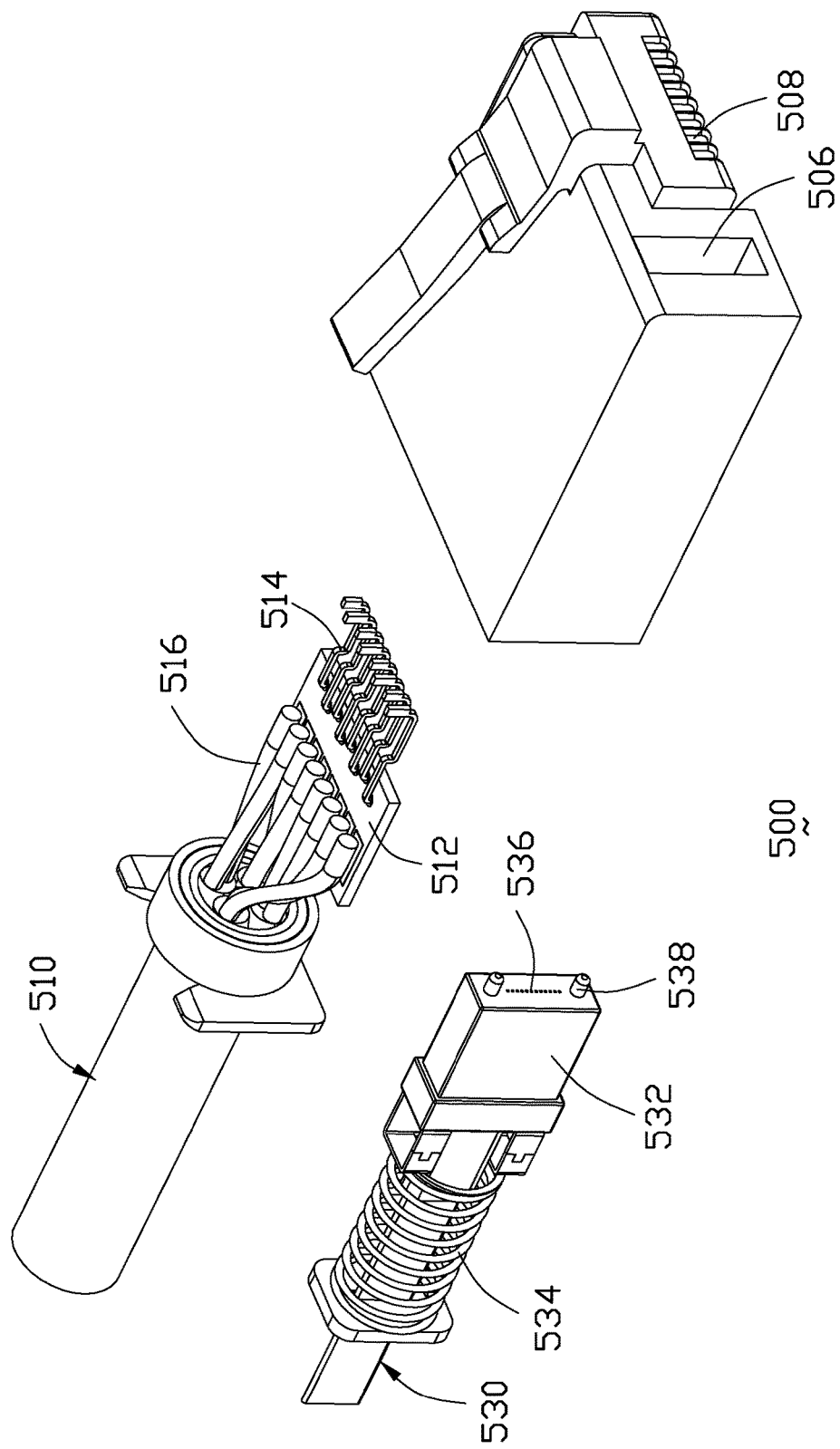
FIG. 12(A) is a front exploded perspective view of the plug connector of FIG. 11(A).
Figure 12B:
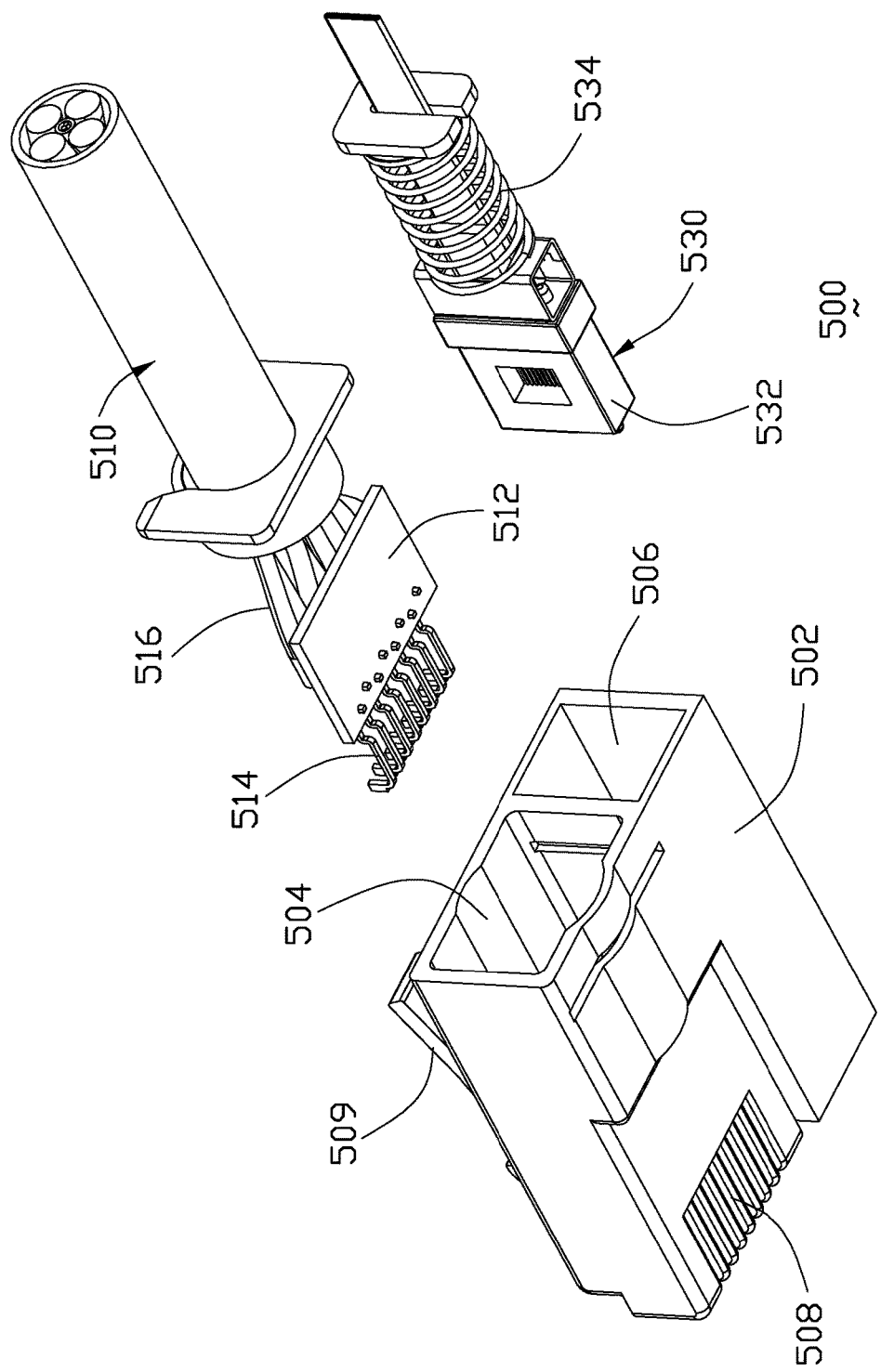
FIG. 12(B) is a rear exploded perspective view of the plug connector of FIG. 11(B).
Figure 13A:
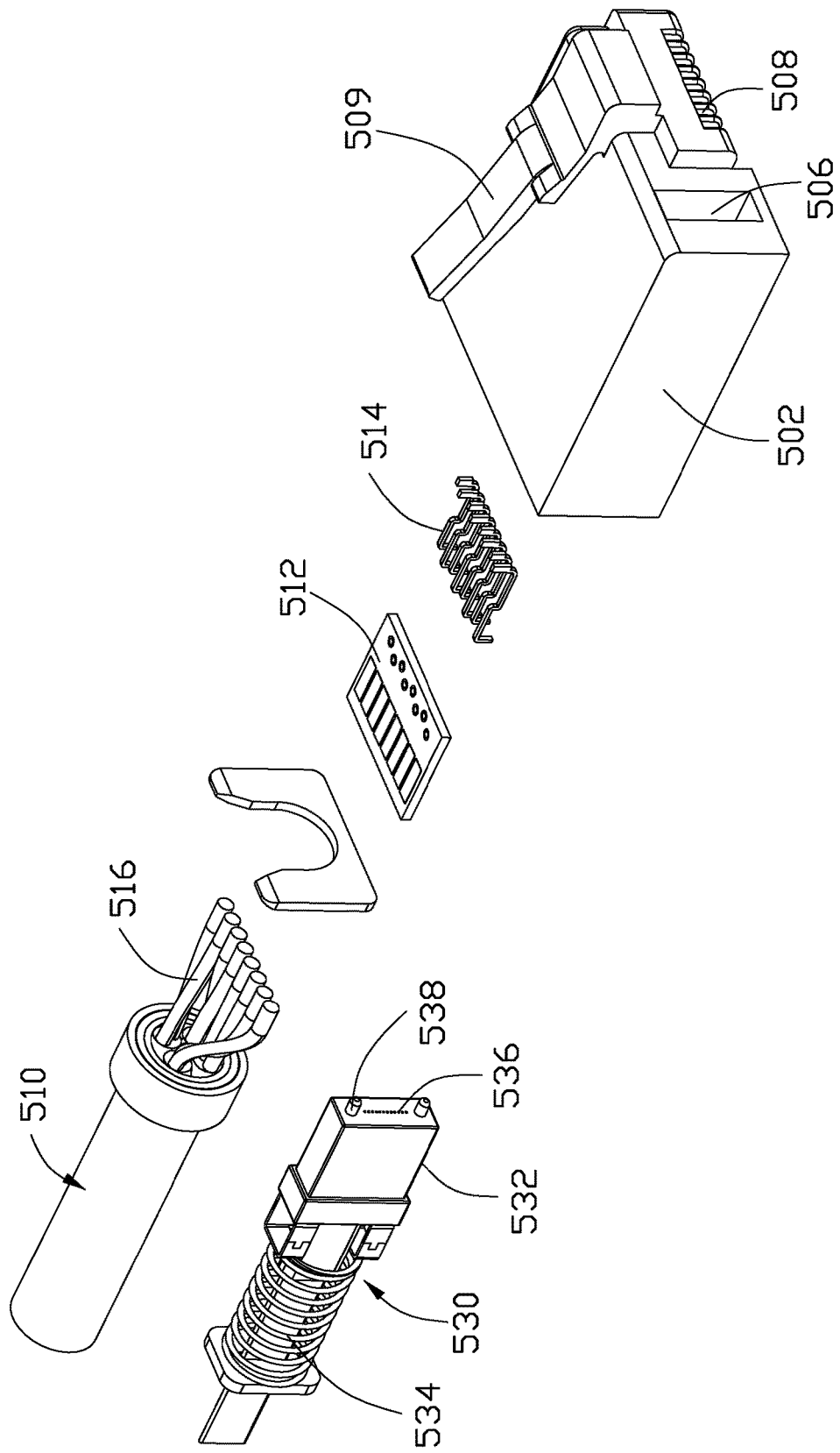
FIG. 13(A) is a further front exploded perspective view of the plug connector of FIG. 12(A).
Figure 13B:
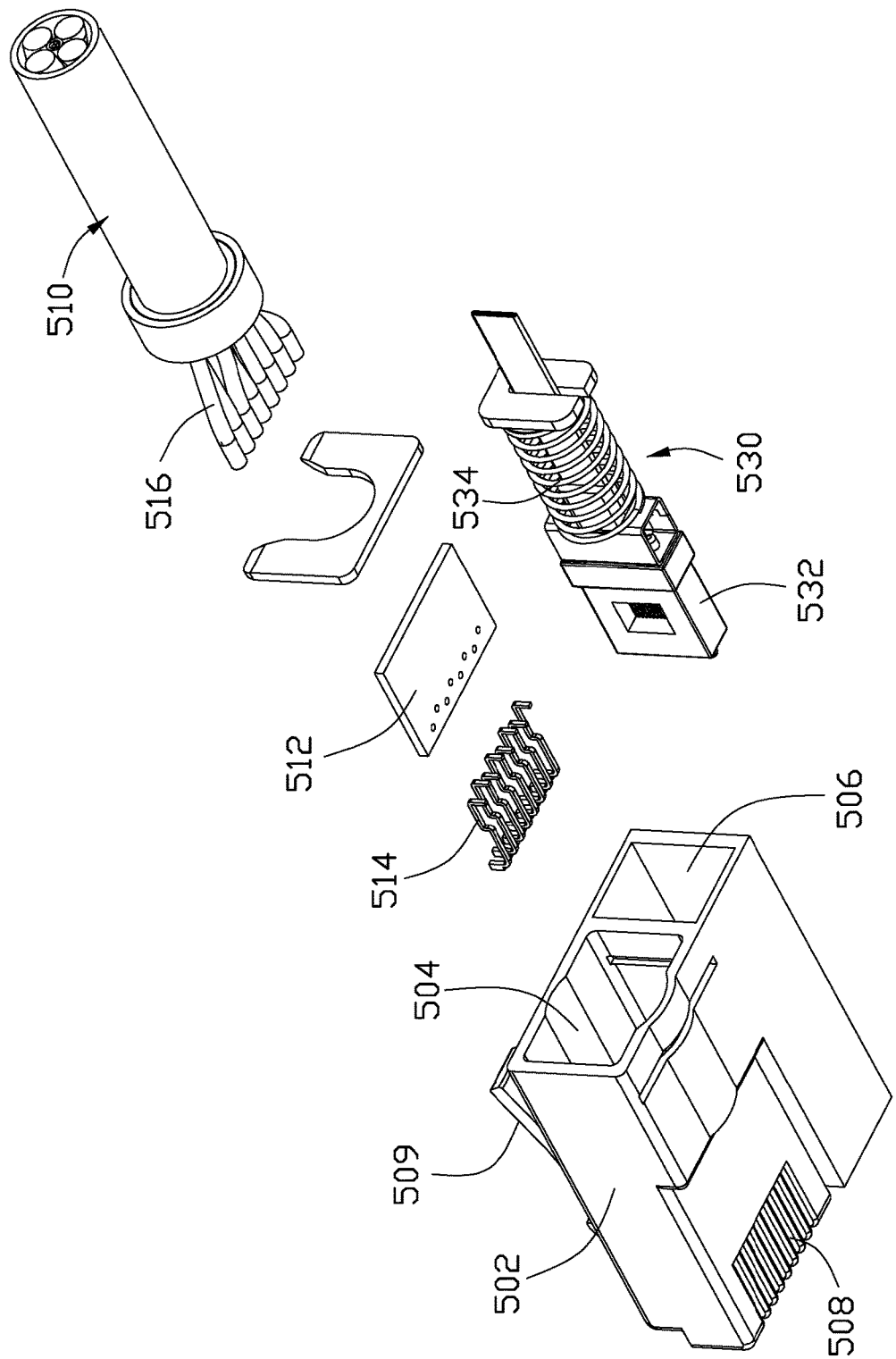
FIG. 13(B) is a further rear exploded perspective view of the plug connector of FIG. 12(B).
Figure 14B:
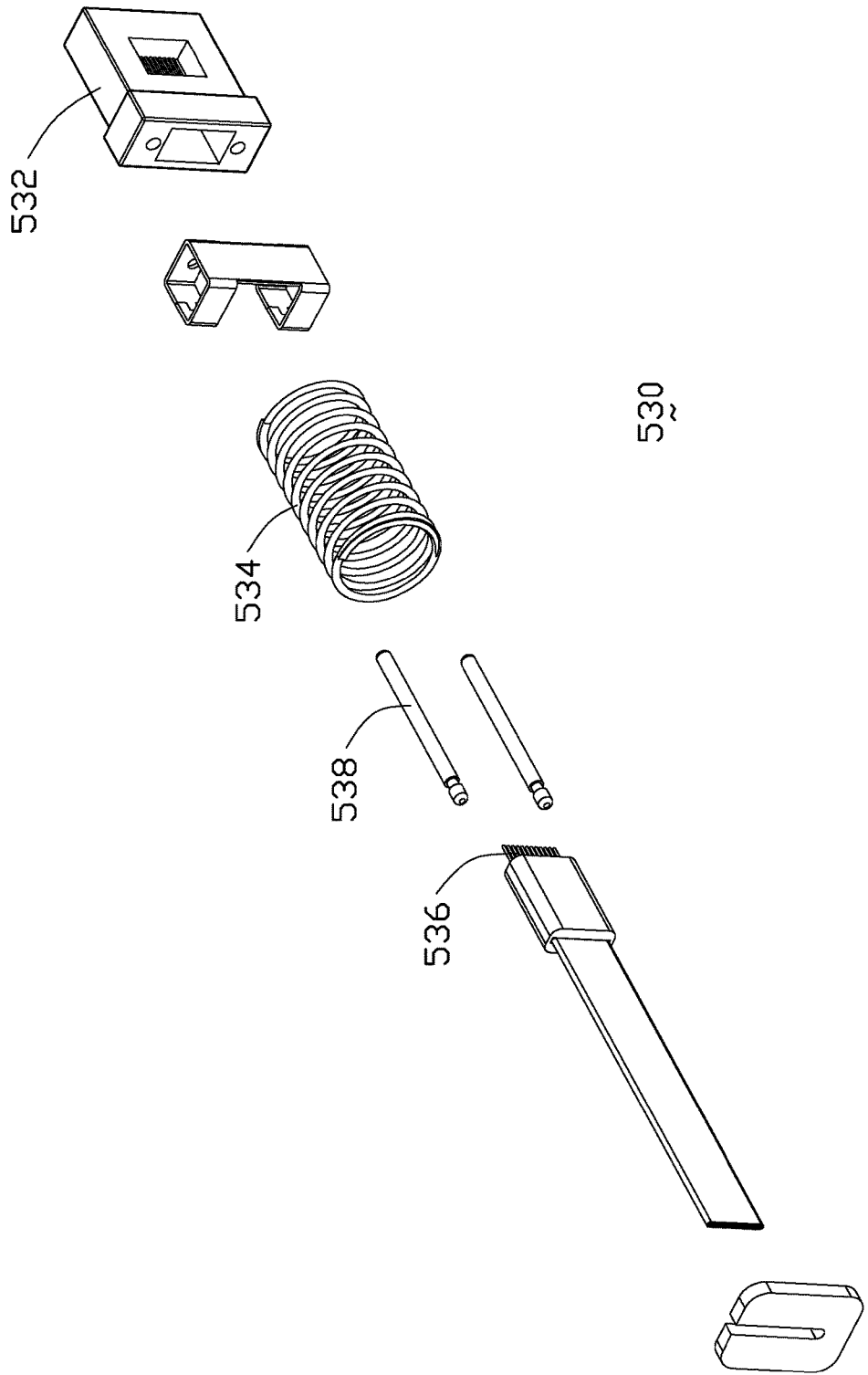
FIG. 14(B) is a rear exploded perspective view of the MPO device of the plug connector of FIG. 11(B).

FIGS. 11(A)-14(B) shows another embodiment wherein the plug connector 500 has the electrical mating port and the optical mating port side by side arranged with each other in a transverse direction. The plug connector 500 includes an insulative housing 502 forming a large cavity 504 and a small cavity 506. The smaller cavity 506 extends through the front face of the housing 502 while the large cavity 504 forwardly communicates with an exterior via a plurality of passageways 508. An electrical connection subassembly 510 is received within the cavity 504 and an optical connection subassembly 530 is received within the cavity 506. The electrical connection subassembly 510 includes a printed circuit board 512 with a plurality of terminals 514 connected to a front region thereof and a plurality of wires 516 connected to a rear region thereof. The optical connection subassembly 530 includes a MPO device 532 equipped with a spring 534 constantly urging the MPO forwardly. Similar to the previous embodiment, the MPO device 532 includes a plurality of optical fibers 536 and a pair of guiding posts 538 by two opposite transverse ends. In this embodiment, the latches 509 are located around the large cavity 504 rather than the small cavity 506. Understandably, the electrical mating port and the optical mating port of the complementary receptacle connector is also arranged in the side by side manner.

What is claimed is:

1. A hybrid receptacle connector assembly comprising:
   a hybrid receptacle connector including:
   an insulative housing dimensioned and configured with a receiving cavity complying with a standard RJ-45 jack and forwardly communicating with an exterior in a front-to-back direction;
   a plurality of passageways formed in the housing and communicating with the receiving cavity in a vertical direction perpendicular to said front-to-back direction;
   a holder assembly located behind the housing and including a holder with a printed circuit board thereon;
   a plurality of electrical components disposed upon the printed circuit board;
   a plurality of contacts connected to the printed circuit board with contacting sections extending into the corresponding passageways and further into the receiving cavity; and
   an MPO (Multi-fiber Push On) device disposed in the holder and behind the receiving cavity with corresponding optical fibers forwardly communicating with the receiving cavity so as to be adapted to be coupled with another MPO device located in a complementary plug connector which is adapted to be received within the receiving cavity.

2. The hybrid receptacle connector assembly as claimed in claim 1, wherein the holder assembly includes a plurality of transformers and a plurality of common mode chokes mounted upon the printed circuit board, the common mode chokes are mounted on a top face of the printed circuit board, and the transformers are mounted on a bottom face of the printed circuit board and protectively received within the holder.

3. The hybrid receptacle connector assembly as claimed in claim 2, wherein the MPO is disposed in front of the transformers and below the contacts.

4. The hybrid receptacle connector assembly as claimed in claim 1, wherein said receptacle connector further comprising a plurality of footer pins mounted to a rear region of the printed circuit board and electrically connected to the corresponding contacts which are mounted on a front region of the printed circuit board.

5. The hybrid receptacle connector assembly as claimed in claim 4, wherein said receptacle connector further includes a metallic shell enclosing said insulative housing and said printed circuit board.

6. The hybrid receptacle connector assembly as claimed in claim 5, further including another printed circuit board opposite to said printed circuit board with the holder therebetween in the vertical direction.

7. The hybrid receptacle connector assembly as claimed in claim 1, wherein the MPO device is essentially located at a mid-level with regard to the receiving cavity in the vertical direction, and each of said contacts is located fully by one side of said mid-level in the vertical direction.

8. A hybrid plug connector comprising:
an insulative case forming a cavity extending through a front face thereof to forwardly communicate with an exterior in a front-to-back direction;
a plurality of passageways formed in the insulative case and spaced from the cavity in a vertical direction perpendicular to said front-to-back direction;
a printed circuit board received within the cavity and having a plurality of terminals connected thereon, a contacting section of each of the terminals extending into the corresponding passageway and communicating with the exterior in the vertical direction;
an MPO device received within the cavity and including a retainer carrying a plurality of optical fibers, a front end of each of said optical fibers reaching a front face of the retainer and the front face of the retainer protruding out of a front face of the case; and
a deflectable latch formed upon the case opposite to the terminals; wherein the MPO device is essentially located at a middle level between the latch and the terminals in the vertical direction.

9. The hybrid plug connector as claimed in claim 8, wherein a vertical dimension of the retainer is not less than one fifth of a vertical dimension of the case in said vertical direction.

10. The hybrid plug connector as claimed in claim 8, further comprising a plurality of wires connected to a rear region of the printed circuit board, wherein the wires and the optical fibers are integrally joined within a cable.

11. The hybrid plug connector as claimed in claim 8, wherein each of the terminals defines a strip configuration with bents thereof.

12. The hybrid plug connector as claimed in claim 11, wherein each of the terminals includes a first vertical portion connecting with the printed circuit board, a first horizontal portion extending forwardly from the first vertical portion, a second vertical portion extending forwardly from the first horizontal portion, a second horizontal portion extending forwardly from the second vertical portion, the second portion forming the contacting portion.

13. The hybrid plug connector as claimed in claim 12, wherein the second horizontal portion forms a pre-loaded portion bended forwardly therefrom.

14. An hybrid connector assembly comprising:
a hybrid plug connector and a hybrid receptacle connector mated with each other for transmission of both electrical and optical signals,
said plug connector including:
an insulative case forming a cavity extending through a front face thereof to forwardly communicating with an exterior in a front-to-back direction;
a plurality of passageways formed in the case adjacent to said cavity;
a printed circuit board retained in the case and having a plurality of terminals connected thereon, a contacting section of each of the terminals extending into the corresponding passageway for coupling in a vertical direction perpendicular to said front-to-back direction;
an MPO device retained in the case and including a retainer carrying a plurality of optical fibers, a front end of each of said optical fibers reaching a front face of the retainer and the front face of the retainer protruding out of a front face of the case; and
a deflectable latch formed upon the case;
said receptacle connector including:
an insulative housing dimensioned and configured with a receiving cavity complying with a standard RJ-45 jack and forwardly communicating with an exterior in said front-to-back direction;
a plurality of passageways formed in the housing and communicating with the receiving cavity in said vertical direction;
a holder assembly located behind the housing and including a holder with another printed circuit board thereon;
a plurality of electrical components disposed upon the printed circuit board;
a plurality of contacts connected to the printed circuit board with contacting sections extending into the corresponding passageways and further into the receiving cavity; and
another MPO (Multi-fiber Push On) device disposed in the holder and behind the receiving cavity with corresponding optical fibers forwardly communicating with the receiving cavity so as to be adapted to be coupled with said MPO device of the plug connector.

15. The hybrid connector assembly as claimed in claim 14, wherein each of said terminals defines a height similar to a thickness of said another printed circuit board in the vertical direction.

16. The hybrid connector assembly as claimed in claim 14, wherein each of said contacts defines a height not beyond a mid-level of the receiving cavity in the vertical direction.

17. The hybrid connector assembly as claimed in claim 14, wherein said printed circuit board and said another printed circuit board are located at a similar level in the vertical direction.

18. The hybrid connector assembly as claimed in claim 14, wherein in the receptacle connector, said another MPO device is located behind the receiving cavity.

19. The hybrid connector assembly as claimed in claim 14, wherein in the plug connector, said MPO is essentially in an upstanding manner.

20. The hybrid connector assembly as claimed in claim 11, wherein each of the terminals defines a strip configuration with bents thereof.

* * * * *